United States Patent [19]
Sjöberg

[11] Patent Number: 5,267,889
[45] Date of Patent: Dec. 7, 1993

[54] SLAUGHTERED ANIMAL STICKING KNIFE AND BLOOD-EXTRACTING ARRANGEMENT THEREFOR

[75] Inventor: John Sjöberg, Smygehamn, Sweden

[73] Assignee: Anitec-John Sjoberg AB, Malmö, Sweden

[21] Appl. No.: 867,118

[22] PCT Filed: Dec. 27, 1990

[86] PCT No.: PCT/SE90/00871
§ 371 Date: Jun. 29, 1992
§ 102(e) Date: Jun. 29, 1992

[87] PCT Pub. No.: WO91/09529
PCT Pub. Date: Jul. 11, 1991

[30] Foreign Application Priority Data
Dec. 29, 1989 [SE] Sweden .................. 8904400

[51] Int. Cl.⁵ .................. A22B 3/10; A22B 5/04
[52] U.S. Cl. .................. 452/65; 452/67; 452/69
[58] Field of Search .................. 452/65, 69, 68, 67

[56] References Cited
U.S. PATENT DOCUMENTS

| | | | |
|---|---|---|---|
| 1,380,447 | 6/1921 | Wescott | 452/69 |
| 1,575,832 | 3/1926 | Higman | 452/65 |
| 2,178,129 | 10/1939 | Wilson | 452/69 |
| 3,292,205 | 12/1966 | Rizzi | 452/68 |
| 3,649,996 | 3/1972 | Marti | 452/65 |
| 3,857,137 | 12/1974 | Baud | 452/68 |

FOREIGN PATENT DOCUMENTS
2818722 11/1979 Fed. Rep. of Germany .
412835 3/1980 Sweden .

Primary Examiner—Willis Little
Attorney, Agent, or Firm—Cushman, Darby & Cushman

[57] ABSTRACT

A sticking knife arrangement for withdrawing blood from slaughter animals is provided for a sticking knife which has a hollow handle. One of the end hollow handle is connectible to a hose. The other end has a blade. The arrangement includes a knife retainer for engaging the body of the animal, when the sticking knife has been stuck into the animal, and an operator connected to the knife retainer to move it between a sticking position and an engaging position. The knife retainer includes at least one arm which is pivotably mounted adjacent the handle and is formed with a hook-shaped end for engagement with the body of the animal, the arm extending, in the sticking position, substantially in parallel with the geometric axis of the sticking knife.

3 Claims, 5 Drawing Sheets

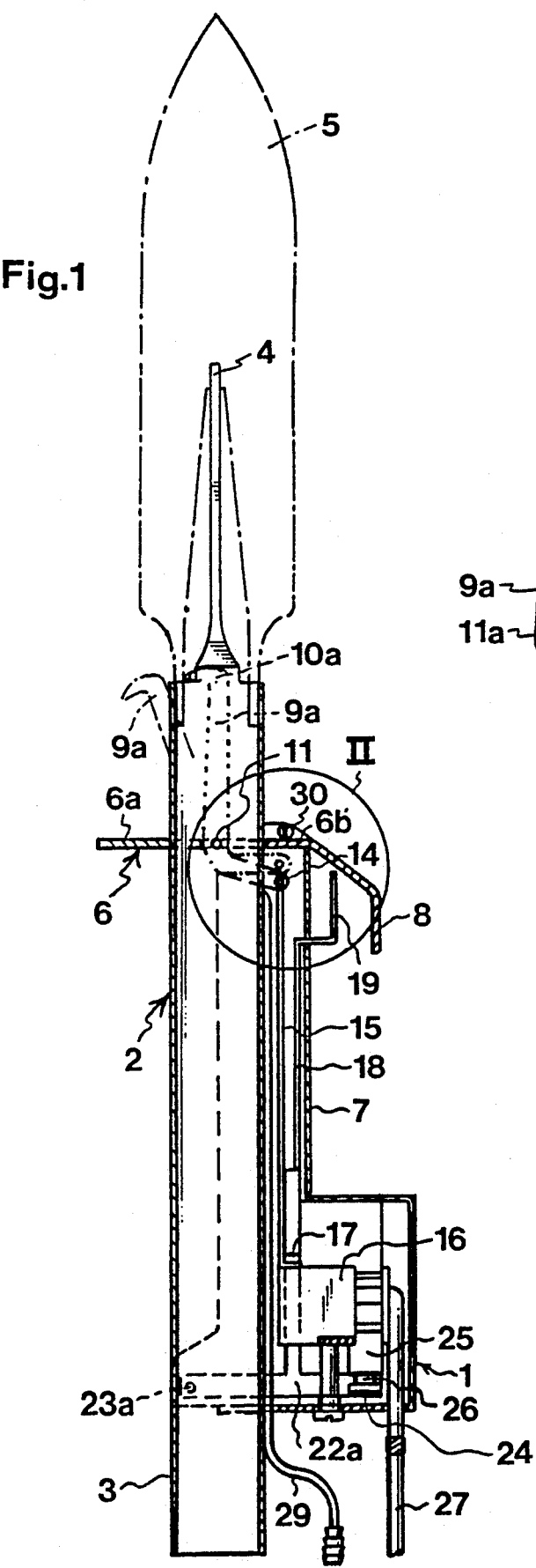
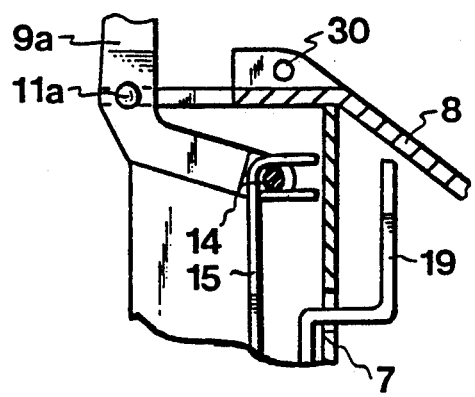
Fig.1
Fig.2

SLAUGHTERED ANIMAL STICKING KNIFE AND BLOOD-EXTRACTING ARRANGEMENT THEREFOR

BACKGROUND OF THE INVENTION

The present invention relates to an arrangement which includes sticking knife for withdrawing blood from slaughtered animals. The sticking knife has a hollow handle whose one end is connectible to a hose and whose other end has a blade. The arrangement includes a knife retainer for engaging the body of the animal, when the sticking knife has been stuck into the animal, and an operator which is connected to said knife retainer to move it between a sticking position and an engaging position. The invention also relates to a sticking knife fitted with such an arrangement.

Sticking knives are used in slaughtering lines in slaughtered houses for withdrawing blood from slaughter animals. The hanging or lying slaughtered animals are transported past a sticking station where a sticker stands ready with a sticking knife. The sticking knife is connected to a vessel via a hose. The sticker sticks the knife into the neck of the animal, and blood flows via the hose down into the vessel. The withdrawal of blood takes 12-60 seconds. The pressure from the escaping blood and the weight of the sticking knife force the sticker to keep the knife inserted in the sticking wound during the entire blood-withdrawing operation. This applies particularly to slaughtered animals which hang. The sticker's working posture may eventually cause strain or joint injuries.

After each animal, the sticking knife must be cleaned and sterilised.

Further on in the slaughtering line, a veterinarian inspects the slaughtered animals. Should he or she find a disease in the animal, this animal must be rejected. Also, the withdrawn blood must be rejected. As a result, high demands are placed on the hygienic conditions in the blood-withdrawing equipment. It must be possible to clean the sticking knife so that there is no remainder of blood on the sticking knife after cleaning. Further, the cleaning operation must be effected during a limited time, owing to the slaughtering speed required in modern slaughter-houses.

SE 412,835 discloses a slaughtering knife having a piston-and-cylinder assembly which is mounted on the knife. When the knife has been stuck into the animal, the assembly is activated so that the piston rod is ejected from the cylinder to engage the sticking wound. As a result, the knife is retained in the wound.

However, this design suffers from a number of drawbacks. There is an obvious risk that blood and fragments of meat accompany the piston rod into the cylinder, when the assembly is deactivated. The piston-and-cylinder assembly thus must be dismantled in the cleaning operation, which makes it unrealistic to believe that cleaning and sterilising is effected after each sticking operation. Moreover, there is a risk that the piston-and-cylinder assembly jams, since the cylinder and the piston rod are curved. A design according to the above-mentioned publication would not comply with today's hygienic and veterinary standards in a modern slaughter-house.

SUMMARY OF THE INVENTION

The main object of the present invention is to overcome the drawbacks of the prior art design.

A further object of the invention is to provide a sticking knife which reduces the leakage from the sticking wound during the withdrawal of blood from a slaughtered animal.

According to the invention, these objects are achieved by means of an arrangement and a sticking knife of the type mentioned by way of introduction.

BRIEF DESCRIPTION OF THE DRAWINGS

The invention will now be described in more detail by means of an embodiment with reference to the accompanying drawings.

In the Drawings

FIG. 1 is a longitudinal cross-sectional view along the line I—I in FIG. 3, of a sticking knife fitted with the arrangement of the present invention.

FIG. 2 is an enlarged detail view of the region shown encircled at II in FIG. 1, with the sticking knife removed.

DETAILED DESCRIPTION

Figure 3:
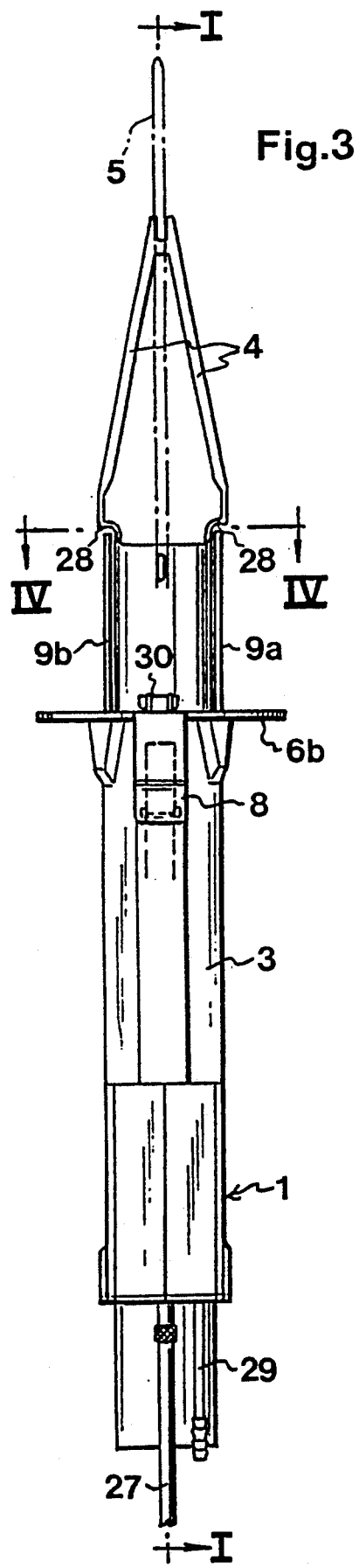
FIG. 3 is a side elevation view of the sticking knife of FIG. 1, as seen from the side fitted with the arrangement.

FIG. 1 shows a sticking knife 2 having a handle 3, a yoke 4 and a blade 5. The blade is detachably mounted in one end of the handle and is supported, besides at the end of the handle, at the outer end of the yoke 4. Moreover, the sticking knife comprises a drip ring 6 and a conduit 29 adapted to supply an anticoagulant to the interior of the handle during the withdrawal of blood from an animal. When the blood passes through the handle, the anticoagulant is entrained from the conduit 29, so that the blood does not coagulate. The end of the handle facing away from the blade is connected to a hose (not shown) which conducts the withdrawn blood to a collecting vessel (not shown).

Figure 4:
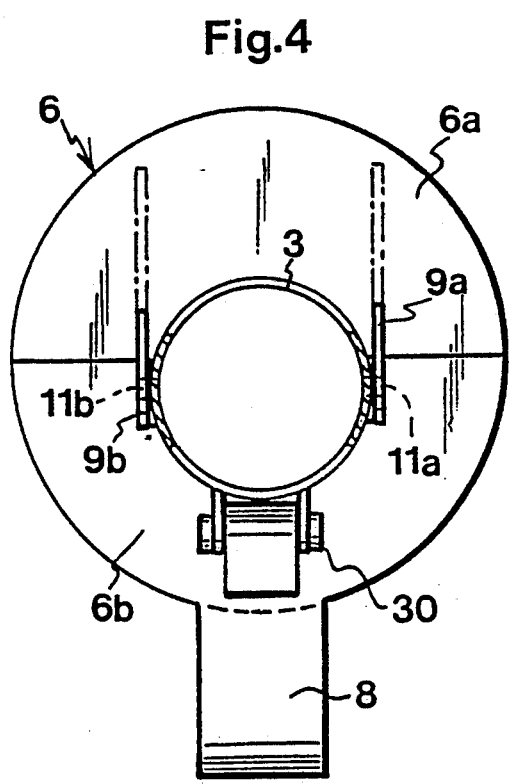
FIG. 4 is a transverse cross-sectional view along the line III—III of FIG. 3.

The sticking knife in FIG. 1 is fitted with an arrangement 1 according to the invention, which in this embodiment consists of a unit which is detachably mounted on the sticking knife. The arrangement comprises a cover 7 whose front end consists of a drip ring half 6b and a hinge pin 30 with holders. In this embodiment, the drip ring 6 thus is divided into one half 6a (FIG. 4) which is fixedly mounted on the handle 3, and another half 6b which is integrally formed with the cover 7. It should be observed that the halves 6a and 6b are not equally large. The handle is formed with lugs for receiving the hinge pin 30. Thus, the arrangement 2 is pivotable away from the handle 3, thereby making the parts inside the cover 7 accessible. The rear part of the cover can be secured by snap action to the handle by means of a joint pins 23a, 23b which will be described in more detail below.

The drip ring is annular and formed with two opposite recesses 31a and 31b (FIG. 5) in the drip ring half 6b. The recesses are positioned in the annular inner edge of the drip ring half in the transition between the drip ring halves 6a and 6b. Each recess comprises a joint pin 11a and 11b, respectively, for pivotably mounting a pair of arms 9a and 9b. These arms constitute a knife-retaining means, the function of which will be described in more detail in connection with FIG. 6. The arms 9a, 9b are substantially L-shaped with a hook-shaped front end 10a and 10b, respectively. The rear ends of the arms are connected to one another via a guide pin 14. FIG. 1 illustrates the operating positions of the arm 9a. Dashed lines indicate a so-called sticking position in which the arm is located, while the sticking knife is stuck into the neck of the animal. Dash-dot lines indicate the position of the arm during withdrawal of blood, i.e. when the sticking knife is kept in place in the animal. In the embodiment shown, there are two arms pivoting in the same direction in parallel planes. Of course, there are other solutions, for example: one arm, two arms which pivot in opposite directions, and arms pivoting in antiparallel planes. In the last-mentioned case, however, care must be taken that the arms do not move in each other's pivot planes.

The arms 9a, 9b are moved between the sticking position and the engaging position by an operating means. This comprises a forked arm 15 and a piston-and-cylinder assembly 16, preferably a pneumatic-type assembly. The front fork end of the forked arm seizes the guide pin 14 between the arms 9a and 9b. The rear end of the forked arm is connected to the piston rod 17 of the piston-and-cylinder assembly 16 which is supplied with compressed air through a conduit 27. FIG. 2 shows clearly how the forked end seizes the guide pin 14.

Figure 5:
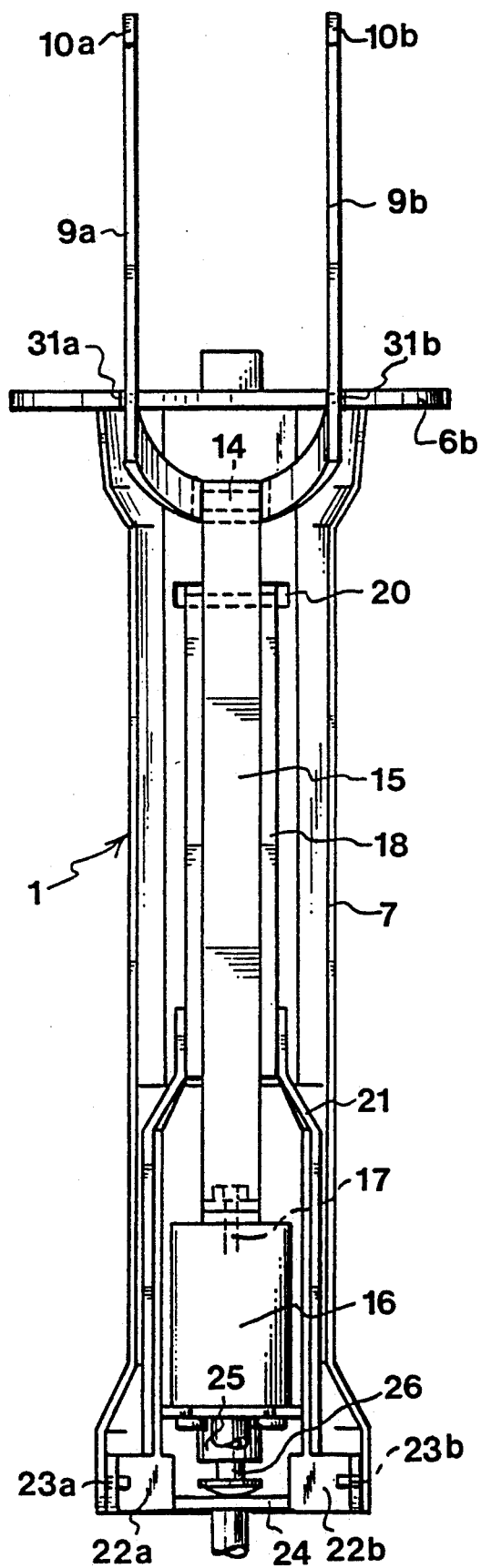
FIG. 5 is an elevation view showing the arrangement according to the invention, especially the moving parts included.

The piston-and-cylinder assembly 16 is activated by a releasing arm 18. The front end of the releasing arm is designed as a trigger 19 projecting through a slit 20 in the cover 7. The other end of the releasing arm is formed with a fork 21, which is best seen in FIG. 5. The fork legs extend backwards, each on one side of the piston-and-cylinder assembly 16 to the rear end of the cover. Each leg terminates in a cross member 22a and 22b, respectively. One end of one cross member is connected to the corresponding end of the other cross member via a contact plate 24, while the opposite ends of the arms are each hingedly connected to a joint pin 23a and 23b, respectively, which are secured to the cover 7. A valve arm 26 of a directional valve 25 is placed in front of the contact plate. The directional valve serves to switch the air pressure from one side of the piston to the other, when the trigger 19 is pressed towards the cover 7. As a result, the valve arm 26 is pressed into the valve body, and the piston is retracted into the cylinder. When pressing the trigger 19, the piston rod 17 will thus pull the arm rear ends backwards, so that the hook-shaped ends of the arms are pivoted inwards to a position where the arms extend substantially in parallel with the geometric axis of the sticking knife. In order to prevent interruption of the supply of air, a pressure accumulator can be mounted in or connected to the arrangement.

When the trigger is released, a return spring (not shown) in the valve 25 will press the valve arm 26 backwards against the contact plate 24, so that the releasing arm 18 is pivoted about the joint pins 23a and 23b back to the original position. The air pressure is switched back to the first side of the piston, whereby the piston rod 17 pivots the arms away from the handle 3.

FIG. 3 shows that the ends of the yoke 4 which are secured to the handle 3 are formed with inwardly curved portions 28 which serve to protect the arms 9a and 9b during insertion of the sticking knife into the animal.

Figure 6:
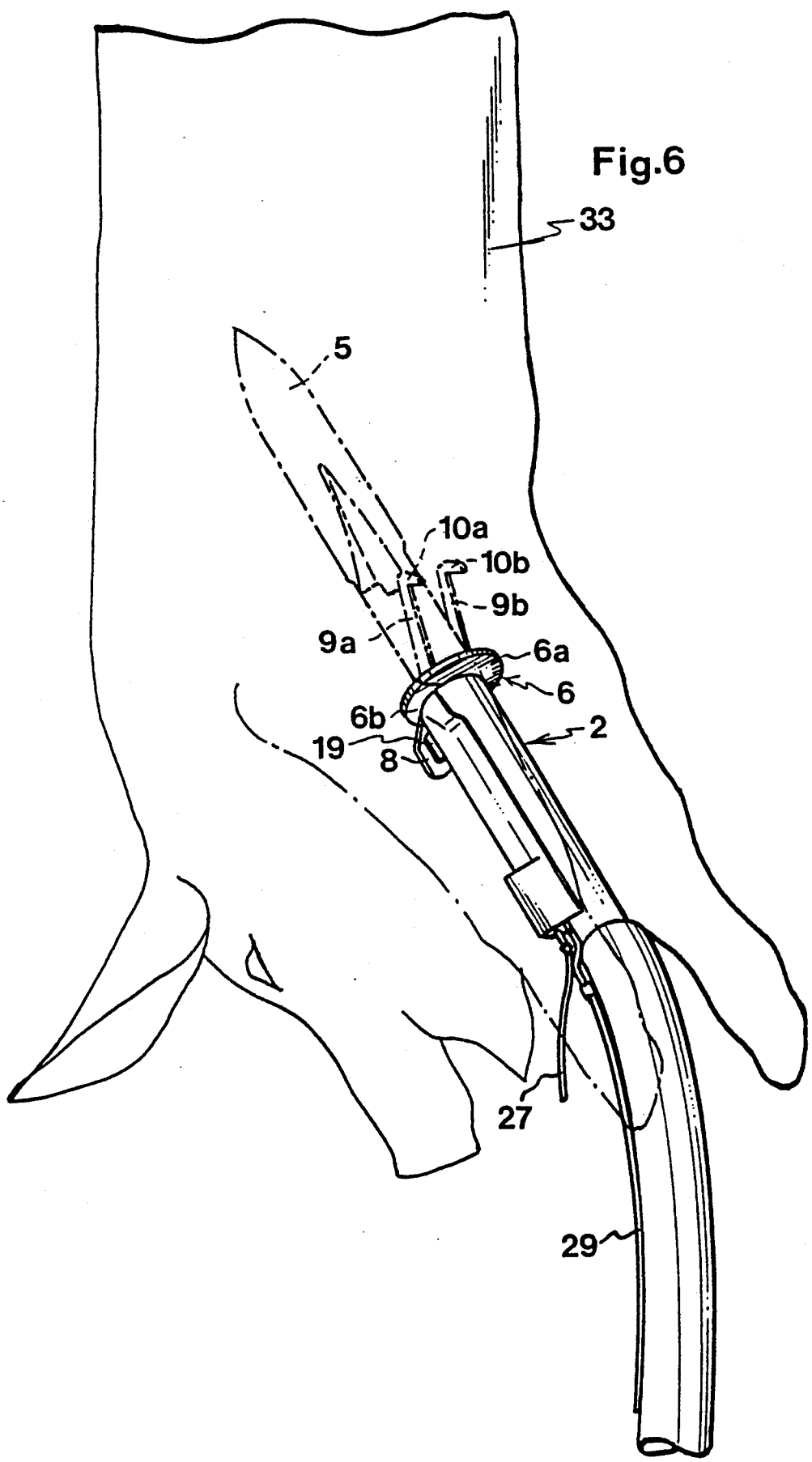
FIG. 6 is a perspective view showing a sticking knife which has been stuck into a hog.

FIG. 6 illustrates a hanging hog 33 into the neck of which a sticking knife 2 according to the invention has been stuck. When the hog hangs in the manner shown, the tissue of the neck portion of the hog will be stretched. The sticking knife is stuck into the hog in such a manner that the hook-shaped ends of the arms 9a, 9b are directed obliquely upwards. When the knife has been stuck into the hog and the sticker has released the trigger, the arms are pivoted away from the handle and the hook-shaped ends are pressed upwards against the wall of the sticking wound. In addition to the effect that the sticking knife is retained in the hog, a further positive effect is gained. The side of the sticking knife 2 opposing the hook-shaped ends of the arms is pressed downwards against the opposite wall of the sticking wound. This provides a seal at the mount of the sticking wound, which reduces the amount of blood flowing out beside the handle. Experiments have shown that practically no blood passes the "wrong" way out of the hog. The stretched tissue also implies that the tissue is tightened around the handle and further reduces the leakage.

The cover 7 can be made tight. If action is taken to product a positive pressure inside the cover, dirt can be prevented from penetrating into the cover, or at least the risk of such penetration can be reduced.

Figure 7:
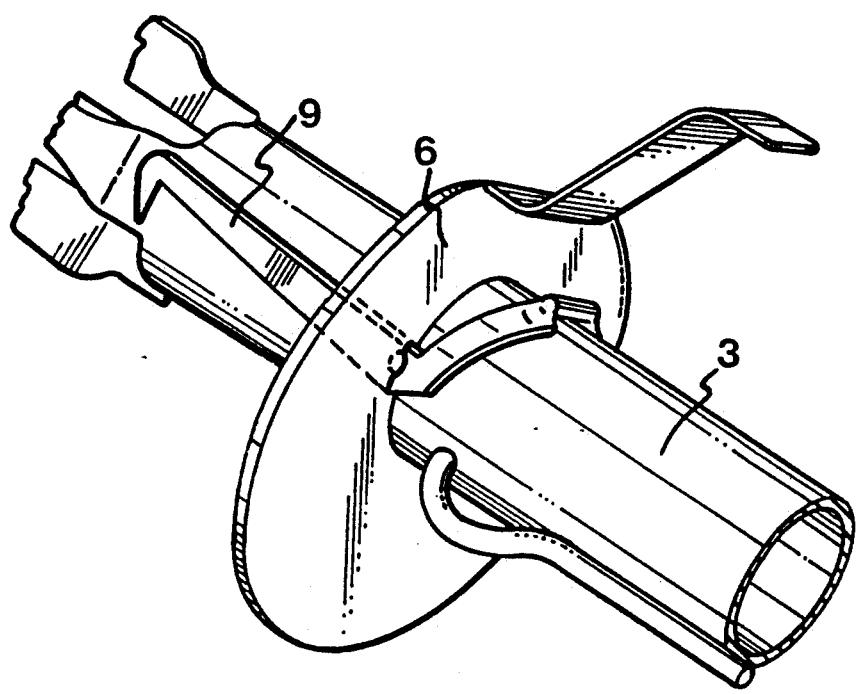
FIG. 7 is a fragmentary perspective view showing part of a second embodiment of the sticking knife according to the invention.

FIG. 7 shows a modification of a sticking knife according to the invention. In this embodiment, the drip ring 6 is made in one piece and fixedly mounted on the handle 3. Recesses in the inner edge of the drip ring pivotably receive the hooks 9. One advantage of this embodiment is that there is no risk that blood will leak through the drip ring and damage the unit detachably mounted on the sticking knife.

I claim:

1. A combined slaughtered animal sticking knife and blood-extracting arrangement therefor, comprising:
    a sticking knife having a blade at one end thereof connected with a hollow handle; said hollow handle, at an opposite end of said knife, being provided with means for connecting said hollow handle to a hose for withdrawing blood from a slaughtered animal while stuck by said blade; said sticking knife having a longitudinal axis;
    a blood extracting arrangement for said sticking knife, said arrangement comprising a knife retainer for engaging the body of the slaughtered animal when said sticking knife has been stuck into said animal;
    said arrangement further including an operating means which is connected to said knife-retaining means for moving said knife-retaining means between a sticking position and an engaging position;
    said knife-retaining means including two arms which are pivotally mounted on one side of said handle; each said arm having a hook-shaped end for engaging said body of said slaughtered animal, said arms extending substantially parallel to said longitudinal axis of said sticking knife when said knife-retaining means is disposed in said sticking position; said two arms both being pivotable in a same direction.

2. The combined sticking knife and arrangement of claim 1, wherein:

said blade extends substantially in a first plane;

said sticking knife further includes a yoke which projects from said handle adjacent said blade, in a second plane which extends at a right angle to said first plane;

said arms, when said knife-retaining means is disposed in said stocking position, being located in substantially the same said second plane as said yoke.

3. The combined sticking knife and arrangement of claim 1, wherein;

said arms are located behind said yoke; and said arms are spaced apart transversally of said longitudinal axis, by a distance which is at least slightly less than the width of said yoke adjacent said arms.

* * * * *